United States Patent
Aarts et al.

(10) Patent No.: US 8,811,119 B2
(45) Date of Patent: Aug. 19, 2014

(54) DISTANCE ESTIMATION USING SOUND SIGNALS

(75) Inventors: Ronaldus Maria Aarts, Eindhoven (NL); William John Lamb, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 21 days.

(21) Appl. No.: 13/698,401

(22) PCT Filed: May 13, 2011

(86) PCT No.: PCT/IB2011/052105
§ 371 (c)(1),
(2), (4) Date: Nov. 16, 2012

(87) PCT Pub. No.: WO2011/145030
PCT Pub. Date: Nov. 24, 2011

(65) Prior Publication Data
US 2013/0064042 A1 Mar. 14, 2013

(30) Foreign Application Priority Data

May 20, 2010 (EP) .................................... 10163401

(51) Int. Cl.
*G01S 15/08* (2006.01)
(52) U.S. Cl.
USPC ............................................. 367/92; 367/99
(58) Field of Classification Search
USPC ..................................................... 367/92, 99
See application file for complete search history.

(56) References Cited

U.S. PATENT DOCUMENTS

| | | | |
|---|---|---|---|
| 6,445,804 B1 | 9/2002 | Hirayanagi | |
| 2005/0248233 A1 | 11/2005 | Pompei | |
| 2005/0276163 A1 | 12/2005 | Moon et al. | |
| 2013/0064042 A1* | 3/2013 | Aarts et al. | 367/99 |

FOREIGN PATENT DOCUMENTS

| | | |
|---|---|---|
| EP | 0597194 A2 | 5/1994 |
| EP | 2010140104 A1 | 12/2010 |
| JP | 2008061137 A | 3/2008 |

(Continued)

OTHER PUBLICATIONS

Yang et al: "Modeling of Finite-Amplitude Sound Beams: Second Order Fields Generated by a Parametric Loudspeaker"; IEEE Transactions on Ultrasonics, Ferroelectrics, and Frequency Control, vol. 52, No. 4, Apr. 2005, pp. 610-618.

(Continued)

*Primary Examiner* — Daniel Pihulic

(57) ABSTRACT

An apparatus comprises a test signal generator (401) which generates an ultrasonic test signal by modulating an audio band test signal on an ultrasonic signal. The ultrasonic test signal is radiated from a parametric loudspeaker (403) and is demodulated by non-linearities in the air. A reflected audio signal may arise from reflections of an object, such as a wall. An audio band sensor (405) generates an audio band captured signal which comprises the demodulated reflected audio band signal. A distance circuit (407) then generates a distance estimate for the distance from the parametric loudspeaker (403) to the object in response to a comparison of the audio band captured signal and the audio band test signal. Specifically two signals may be correlated to determine a delay corresponding to the full path length. Based on the distance estimates an audio environment may be estimated and a sound system may be adapted accordingly.

15 Claims, 6 Drawing Sheets

(56) References Cited

FOREIGN PATENT DOCUMENTS

WO 2004066673 A1 8/2004
WO 2009056858 A2 5/2009
WO WO 2011145030 A1 * 11/2011

OTHER PUBLICATIONS

Lee et al: "Bandwidth-Efficient Recursive pTH-Order Equalization for Correcting Baseband Distrotion in Parametric Loudspeakers"; IEEE Transactions on Audio, Speech, and Language Processing, vol. 14, No. 2, Mar. 2006, pp. 706-710.

Kite et al: "Parametric Array in Air: Distortion Reduction by Preprocessing"; Proc. 16th Int. Cong. Acoust., vol. 2, Jun. 1998, pp. 1-2.

Schroeder: "New Method of Measuring Reverberation Time"; Acoustical Society of American, 1965, pp. 409-412.

Schroeder: "Integrated-Impulse Method Measuring Sound Decay Without Using Impulses"; J Acoust. Soc. Am. 66(2), Aug. 1979, pp. 497-500.

* cited by examiner

DISTANCE ESTIMATION USING SOUND SIGNALS

FIELD OF THE INVENTION

The invention relates to estimation of distances to objects and in particular but not exclusively to characterisation of audio environments based on estimation of distances.

BACKGROUND OF THE INVENTION

Automated determination of distances is important for many applications. For example, the audio environment greatly affects the performance of a loudspeaker system, and e.g. the acoustics of a room significantly affect the spatial experience that can be provided by a spatial sound reproduction system. To provide the best possible spatial rendering it is therefore important that the sound reproduction system be properly calibrated to the specific audio environment. Since it is not possible in advance to account for every possible permutation of room size, sound system location and listener position etc, it is in practice only possible to provide a limited number of preset options. A proper calibration of a sound reproduction system must therefore be carried out with the equipment in situ. To optimize the sound reproduction, the room geometry, the listening position and the location of the rendering device should preferable be known. While it is possible to measure this data manually, this would represent an undesirable amount of effort on the part of the user, and would be subject to user error. If the room geometry can be measured automatically, optimization can be automatic and free from user error. Such a room geometry may be determined from distance measurements to room objects such as walls and therefore a practical system for determining such distances to objects is highly advantageous.

It has been proposed to determine distances to walls based on measurements of directional sound signals. WO200466673A1 discloses a system wherein a conventional loudspeaker array and at least one microphone are used to calibrate a sound bar system wherein a plurality of spatial channels are generated from a single loudspeaker device using a loudspeaker array and directed radiation of sound signals.

The disclosed system uses the conventional loudspeaker array to create a beam of directional sound which is aimed towards a wall. The reflected sound is recorded by a microphone and the time difference between emission of the sound and capture of the sound is used to determine the distance to the reflecting object. This approach is very similar to a standard sonar system. The use of a conventional loudspeaker array for this system had several disadvantages. A conventional loudspeaker array can only produce highly directional sound beams over a limited range of frequencies determined by the width of the array and the spacing of the loudspeakers. The limited bandwidth results in the disclosed system using a single frequency test tone for the calibration which may result in e.g. reduced signal to noise ratio compared to wider bandwidth signals. The disclosed system may also be prone to lobbing artefacts which can give rise to spurious results.

Another problem faced by the use of a conventional loudspeaker array is that the large aperture required for high directivity also results in a large audio beam spot size which reduces the resolution of the measurement system. To address this problem WO200466673A1 suggests that a focusing algorithm is used to reduce the beam spot size. However, in order to focus the beam, the distance to the reflecting object must be known in advance, i.e. it requires that the distance that is to be measured is already known. As such an iterative optimisation procedure is required to focus the beam to a suitable spot size and identify the location of the wall with a suitable accuracy. This is expensive in terms of both processing power and measurement/setup time.

Range detection systems based on ultrasound have also been used for determining the distance to walls. These systems radiate an ultrasound signal towards a wall and measure the time it takes before the ultrasound signal is received back. The distance may then be determined to correspond to half of the round trip delay for the ultrasound signal. However, such ultrasonic ranging systems require that the reflective surface is perpendicular to the ultrasonic sound beam and are very sensitive to deviations there from. Indeed, in many cases even a small deviation from a perpendicular angle results in the measured signals corresponding to a path with multiple reflections (e.g. of more walls) thereby leading to erroneous results and thus e.g. an erroneous calibration of a sound reproduction system. Sound ultrasonic ranging systems therefore tend to be impractical for many fixed calibration systems wherein the ranging device cannot practicably be positioned and aimed directly towards an object to which the distance is being measured. In particular, they tend to require manual operation and are unsuitable for many automated systems where the exact position and direction from the ranging device to the objects are not known.

Hence, an improved system for determining a distance would be advantageous and in particular a system allowing for increased flexibility, facilitated implementation, facilitated operation, improved accuracy, increased flexibility in geometric relationship between the system and object, improved suitability for automatic ranging and calibration, improved directionality, increased focussing, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a distance to an object: a test signal generator for generating an ultrasonic test signal by modulating an audio band test signal on an ultrasonic signal; a parametric loudspeaker for radiating the ultrasonic test signal in a first direction; an audio band sensor for generating an audio band captured signal comprising a demodulated reflected audio band signal resulting from the ultrasonic test signal; and a distance circuit for generating a distance estimate for a distance from the parametric loudspeaker to the object in response to the audio band captured signal and an reflected audio signal estimate for the audio band test signal.

The invention may provide improved and/or facilitated distance estimation. The distance measurement may in many embodiments be more suitable for automatic distance estimation and/or may be more insensitive to variations in the geometric characteristics of the measurement scenario. In particular, the invention may provide improved distance estimation for scenarios wherein the direction from the sensor/parametric loudspeaker is not perpendicular to the surface of the object. In many scenarios a more accurate directional distance measurement may be achieved, and in particular a smaller beam spot size may be achieved while maintaining low complexity.

The distance circuit may generate the distance estimate in response to a relative timing of the audio band captured signal and the audio band test signal.

The audio band may be below 20 kHz with the ultrasonic signal having a frequency above 20 kHz. The audio band captured signal may correspond to captured sound in a frequency interval within the frequency band from 0 Hz to 15 kHz and may typically include sound from a frequency interval that includes frequencies below 10 kHz or 5 kHz.

In many embodiments the audio band test signal may advantageously have a frequency bandwidth of no less than 500 Hz, and in some embodiments more advantageously a frequency bandwidth of no less than 1 kHz, 2 kHz or even 5 kHz. This may in many scenarios allow a more accurate estimation and may often allow improved estimation of related characteristics such as an angle of the reflecting surface or a size of the reflecting object.

The audio band test signal may e.g. be a (e.g. logarithmic) frequency sweep signal, a maximum length sequence or a random band limited noise signal. In some embodiments the audio band test signal may e.g. be a single tone signal.

The parametric loudspeaker and the audio band sensor may typically be substantially co-located. Such a co-location may for example correspond to less than a tenth of the distance to be estimated, and may in many embodiments be less than 50 cm, 25 cm, or even 10 cm.

The ultrasonic test signal may be directionally radiated, such as e.g. with a directional beam having a 6 dB attenuation at an angle of less than 10° or 20° for a frequency interval from 3 kHz to 10 kHz or even for a frequency interval from 1500 Hz up to 15 kHz. The main lobe angle may be larger at lower frequencies and may e.g. be less than 40° at 500 Hz.

The distance circuit may be arranged to determine the distance estimate in response to a timing of an earliest correlation peak between the audio band captured signal and the audio band test signal after a time threshold.

This may allow a practical and accurate distance determination. The time threshold may be a predetermined time delay and may typically correspond to a path length that is longer than a distance from the parametric loudspeaker to the audio band sensor.

The reflected audio signal estimate may in some embodiments be the same as the audio band test signal or may e.g. be a modified or processed version of this, e.g. determined to compensate for the effects of the non-linear demodulation.

In accordance with an optional feature of the invention, the distance circuit is arranged to generate an angle estimate between the first direction and a reflecting surface of the object in response to a frequency distribution characteristic of the audio band captured signal.

This may provide additional information that may allow improved and/or extended functionality. For example, when used to determine or estimate an audio environment geometry, it may allow a more accurate determination of the geometry and thus an improved sound reproduction based thereon.

In particular, the distance circuit may be arranged to generate the angle estimate such that a higher relative high frequency energy concentration is indicative of a more perpendicular angle. The distance circuit may be arranged to bias the angle estimate towards a 90° angle for increasing energy concentration towards higher frequencies. This may allow suitable estimation of the angle in many embodiments.

In accordance with an optional feature of the invention, the distance circuit is arranged to generate a size estimate for the object in response to a frequency distribution characteristic of the audio band captured signal.

This may provide additional information that may allow improved and/or extended functionality. For example, when used to determine or estimate an audio environment geometry, it may allow a more accurate determination of the geometry and thus an improved sound reproduction based thereon. Additionally or alternatively it may allow or assist in object identification in the audio environment.

In particular, the distance circuit may be arranged to generate a size estimate such that a higher relative low frequency energy concentration is indicative of a larger size. The distance circuit may be arranged to bias the size estimate towards larger sizes for increasing energy concentration towards lower frequencies. This may allow suitable estimation of the size of a reflecting object in many embodiments.

In accordance with an optional feature of the invention, the distance circuit is arranged to determine an earliest correlation peak between the audio band captured signal and the reflected audio signal estimate after a time threshold and to generate a multiple reflection distance estimate in response to a timing of a subsequent correlation peak between the audio band captured signal and the reflected audio signal estimate.

This may provide additional information that may allow improved and/or extended functionality. For example, when used to determine or estimate an audio environment geometry, it may allow a more accurate determination of the geometry and thus an improved sound reproduction based thereon.

In accordance with an optional feature of the invention, the apparatus further comprises an audio environment circuit arranged to: vary the first direction; receive distance estimates for different values of the first direction; and determine an audio environment geometry in response to the distance estimates.

The approach may be particularly advantageous for determining an audio environment geometry, such as a room geometry. An improved accuracy may be obtained in many embodiments thereby allowing improved adaptation of a sound reproduction system and thus improved sound reproduction by the sound reproduction system. In particular, improved spatial sound reproduction can be achieved for spatial sound systems.

In accordance with an optional feature of the invention, the parametric loudspeaker comprises an array of ultrasonic transducers and the audio environment circuit is arranged to control a value of the first direction by controlling at least one of a relative delay, phase and gain for the ultrasonic transducers.

This may allow a particularly advantageous approach and may e.g. reduce complexity, facilitate operation and/or provide a more accurate control of the first direction. The audio environment processor may implement a beamforming algorithm for the array of ultrasonic transducers.

In accordance with an optional feature of the invention, the distance circuit is arranged to generate a multiple reflection distance estimate in response to a comparison of the audio band captured signal and the reflected audio signal estimate, the multiple reflection distance estimate being indicative of a distance of a path from the parametric speaker to the audio band sensor comprising a plurality of reflections; and wherein the audio environment circuit is further arranged to determine the audio environment geometry in response to the multiple reflection distance estimate.

This may allow a more accurate determination of the geometry and thus an improved sound reproduction based thereon.

In accordance with an optional feature of the invention, the audio environment circuit is arranged to determine a reverberation time for the audio environment and to determine the audio environment geometry in response to the reverberation time.

This may allow a more accurate determination of the geometry and thus an improved sound reproduction based thereon.

In accordance with an optional feature of the invention, the audio environment circuit is arranged to receive a further audio band captured signal comprising a user originated sound and to determine a listening position in response to the further audio band captured signal and the audio environment geometry.

This may provide additional information that can allow an improved adaptation of a sound reproduction system and specifically may allow optimisation for the listening position. The user originated sound may be an assumed user originated sound and the approach may determine the listening position based on an assumption of the further audio band captured signal comprising the user originated sound and the estimated audio environment geometry.

The further audio band captured signal may be generated by the audio band sensor and may be the same as the audio band captured signal or may e.g. be another signal provided by another sensor.

In accordance with an optional feature of the invention, the apparatus is arranged to iteratively determine distance estimates for corresponding values of the first direction, and the audio environment circuit is arranged to estimate the audio environment geometry in response to dynamic variations in the distance estimates for the corresponding values of the first direction.

In some embodiments, the apparatus may be arranged to iteratively determine distance estimates for the audio environment and the audio environment processor is arranged to estimate the audio environment geometry in response to dynamic variations in the distance estimates.

The consideration of dynamic variations may allow an improved estimation of the audio environment. Corresponding directions may be substantially the same directions.

In accordance with an optional feature of the invention, the apparatus is arranged to iteratively determine distance estimates for corresponding values of the first direction and the audio environment circuit is arranged to estimate a listening position in the audio environment in response to dynamic variations in the distance estimates for the corresponding values of the first direction.

In some embodiments, the apparatus may be arranged to iteratively determine distance estimates for the audio environment and the audio environment processor is arranged to estimate a listening position in response to dynamic variations in the distance estimates.

The consideration of dynamic variations may allow a particularly efficient estimation of a listening position. Corresponding directions may be substantially the same directions.

In accordance with an optional feature of the invention, there is provided spatial sound reproduction system comprising the apparatus previously described, and wherein the audio environment circuit is arranged to adapt a characteristic of a spatial sound reproduction in response to the audio environment geometry.

The invention may allow a particularly advantageous spatial sound reproduction system with improved adaptation to the specific usage environment.

In accordance with an optional feature of the invention, the audio environment circuit is arranged to control a direction of directional sound for at least one spatial channel in response to the audio environment geometry.

The invention may allow a particularly advantageous approach for controlling directional sound radiation for spatial channels. The spatial channel may specifically be a surround (side or rear) channel. The approach is particularly advantageous for directing spatial channels that are intended to reach a listening position via one or more reflections such that the spatial channel is perceived to originate from another position than that of the loudspeaker radiating the signal.

In accordance with an optional feature of the invention, the parametric speaker is arranged to reproduce sound for at least one spatial channel.

The approach may allow a parametric loudspeaker to provide a spatial channel thereby allowing this to be accurately directed with a small beam to provide an accurate spatial perception. A critical and accurate directional radiation of such a signal may automatically be adapted to the specific audio environment without requiring additional loudspeakers. The same parametric loudspeaker may thus be used for different but interlinked functions to provide an improved spatial perception while maintaining low cost.

According to an aspect of the invention there is provided a method of determining a distance to an object, the method comprising: generating an ultrasonic test signal by modulating an audio band test signal on an ultrasonic signal; radiating the ultrasonic test signal in a first direction from a parametric loudspeaker; capturing an audio band captured signal by an audio band sensor, the audio band captured signal comprising a demodulated reflected audio band signal resulting from the ultrasonic test signal; and generating a distance estimate for a distance from the parametric loudspeaker to the object in response to the audio band captured signal and a reflected audio signal estimate the audio band test signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a calibration of a spatial sound reproduction system based on an audio environment geometry determined from distance measurements. However, it will be appreciated that the invention is not limited to this application but may be applied in many other scenarios and for many other applications.

Figure 1:
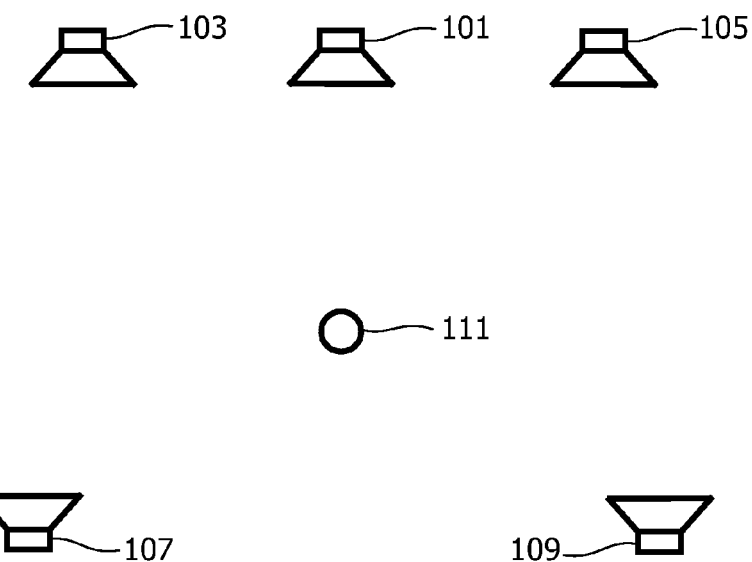
FIG. 1 is an illustration of a speaker system setup for a surround sound system.

FIG. 1 illustrates a speaker system setup for a conventional five channel surround sound spatial sound reproduction system, such as a home cinema system. The system comprises a center speaker 101 providing a center front channel, a left front speaker 103 providing a left front channel, a right front speaker 105 providing a right front channel, a left rear speaker 107 providing a left rear channel, and a right rear speaker 109 providing a right rear channel. The five speakers 101-109 together provide a spatial sound experience at a listening position 111 and allow a listener at this location to experience a surrounding and immersive sound experience. In many home cinema systems, the system may further include a subwoofer for a Low Frequency Effect (LFE) channel.

The requirement for loudspeakers to be located to the side or behind the listening position is typically considered disadvantageous as it not only requires additional loudspeakers to be located at inconvenient positions but also require these to be connected to the driving source, such as typically a home cinema power amplifier. In a typical system setup, wires are required to be run from the surround loudspeaker positions 107, 109 to an amplifier unit that is typically located proximal to the front speakers 101, 103, 105. This is particularly disadvantageous for products like home cinema systems which are intended to have a broad appeal and application in environments that are not optimised for or dedicated to the sound experience.

Figure 2:
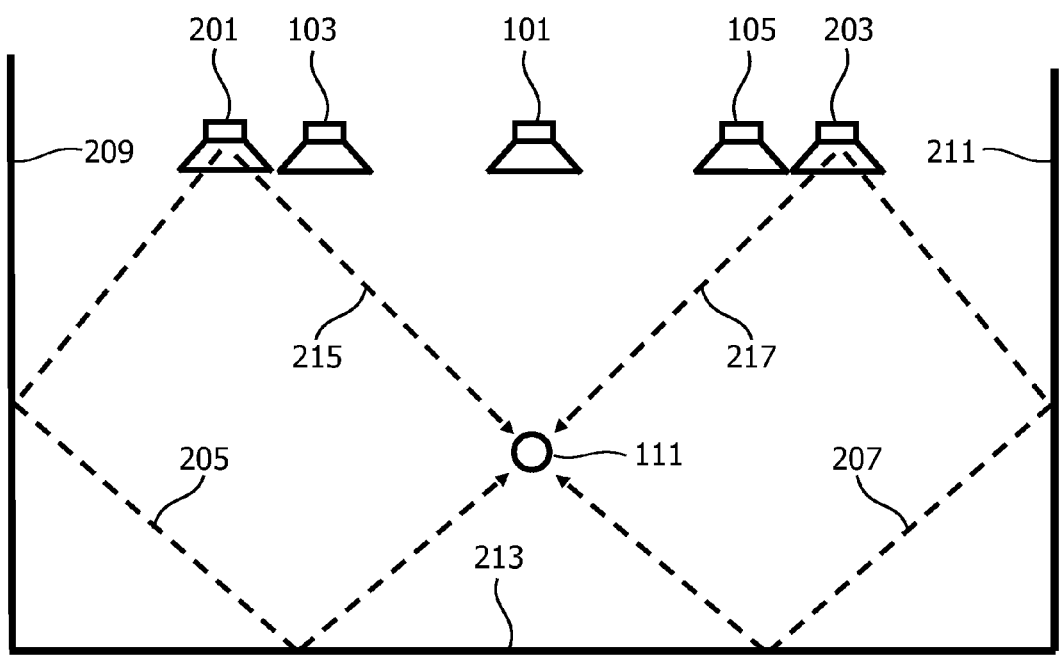
FIG. 2 is an illustration of an example of speaker system setup for a surround sound system.

FIG. 2 illustrates an example of a modified speaker system setup. In this example, the front loudspeakers, namely the left front loudspeaker 103, the centre loudspeaker 101, and the right front loudspeaker 105, provide the sound image to the front of the listening position 111. However, in the system of FIG. 2, the surround sound signals are not provided by separate loudspeakers positioned to the rear of the user but are provided by loudspeakers 201, 203 positioned to the front of the listening position 111. In the specific example, a left surround speaker 201 is located adjacent to the left front speaker 103 and a right surround speaker 203 is located adjacent to the right front speaker 105.

In the example, the surround speakers 201, 203 are arranged to radiate a sound signal 205, 207 that is reflected by the side walls 209, 211 and the rear wall 213 to reach the listening position 111 from a direction to the rear of the listener. Thus, the rear surround speakers 201, 203 provide surround signals 205, 207 that appear to the listener to originate from the back. This effect is achieved by radiating the rear sound signals 205, 207 such that they are reflected by the walls 209, 211, 213. In the specific example, the surround sound signals 205, 207 reach the listening position predominantly via two wall reflections, namely of the sidewalls 209, 211 and of rear wall 213. However, it will be appreciated that other embodiments and scenarios may include fewer or more reflections. For example, the surround signals 205, 207 may be radiated to reach the listening position 111 by a single reflection of a side wall 209, 211 thereby providing a perceived virtual sound source to the side of the user.

In the example of FIG. 2, each spatial channel is radiated by its own individual speaker. The described approach allows for an effective surround experience while allowing the surround speakers 201, 203 to be located to the front of the user and in particular co-located or adjacent to one of the front speakers 101, 103, 105. However, this further allows the same speaker to be used to render more than one of the spatial channels. Thus, in many embodiments, the surround speakers 201, 203 may also be used to render one of the front channels.

In the specific example, the left surround speaker 201 may also render the left front channel and the right surround speaker 203 may also render the right front channel. However, as the left and right front channels should be provided directly to the listening position (via a direct path) such that they appear to come from the front, i.e. directly from the speaker position, the front channel is rendered in a different direction than the surround channel.

Figure 3:
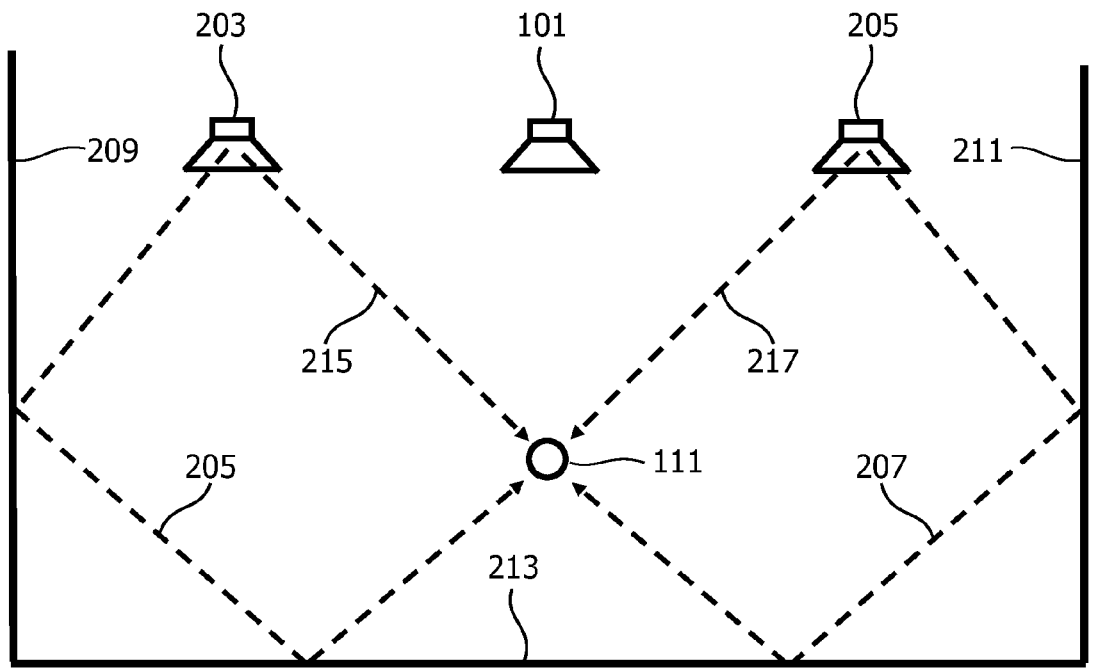
FIG. 3 is an illustration of an example of speaker system setup for a surround sound system.

Thus, accordingly, the left front speaker 103 and the right front speaker 105 can be removed and instead the left surround speaker 201 and the right surround speaker 203 can be used resulting in the system of FIG. 3. The spatial systems of FIGS. 2 and 3 are thus based on directional sound radiation by at least the left surround speaker 201 and the right surround speaker 203. This may e.g. be achieved by using directional driver units angled in the desired direction but may more frequently be achieved by using transducer arrays that can be beam steered. Thus, each of the left surround speaker 201 and the right surround speaker 203 may comprise a plurality of transducer units that are fed differently weighted (phase and/or amplitude) and/or delayed versions of the drive signals to provide the desired beam forming and thus directionality.

All of the systems will furthermore provide a spatial sound experience at the listening position 111 which is heavily dependent on the geometry of the audio environment. Specifically, the room geometry affects the perceived spatial sound. In particular, the spatial perception of the surround channels of FIGS. 2 and 3 is achieved by reflections of the walls and is thus very heavily dependent on the specific room geometry.

Accordingly, it is important to calibrate and adapt the sound reproduction system to the specific audio environment and specifically room geometry. This may often be achieved manually or semi-automatically requiring a user to position a microphone at the listening position and performing a dedicated calibration process. However, this tends to be complex, time consuming, confusing and impractical for many typical users.

In the following, a system will be described which can generate automatic estimates of the room/audio environment geometry which allows the sound reproduction system to be calibrated for the specific environment. The system is based on distance measurements that use a combination of ultrasound and audio band signals and measurements.

The described approach uses a parametric loudspeaker to radiate a modulated ultrasonic signal in a given direction. Thus, an ultrasonic transmitter (in the form of the ultrasonic loudspeaker) projects a highly directional beam of high intensity ultrasound modulated by an audio band test signal. As the ultrasound propagates through the air, the audio band test signal is demodulated to form a highly directional beam of sound. When this sound beam encounters an obstacle, such as a wall, ceiling or large object, the audio frequency sound is reflected over a broad range of angles and is subsequently recorded by an audio band sensor (such as a standard audio microphone) placed near the transmitter. The time difference between the transmission and receiving of the reflected signal is then used to identify the distance to the reflecting/scattering object.

The approach may be used to perform a scan over a set of angles thereby allowing e.g. the distance from the device to the walls and/or ceiling of the room to be calculated and allowing a geometric model of the room to be built. Using this information the sound reproduction system can then be adjusted to optimize the sound rendering for any given room and listening position. The following description will focus on the determination of a two dimensional room geometry by determining distance and positions of walls of a room but it will be appreciated that the approach may equally be applicable to determination of a three dimensional room geometry. In particular, it will be appreciated that the described approach is equally appropriate for e.g. determining a distance to the ceiling of a room.

Figure 4:
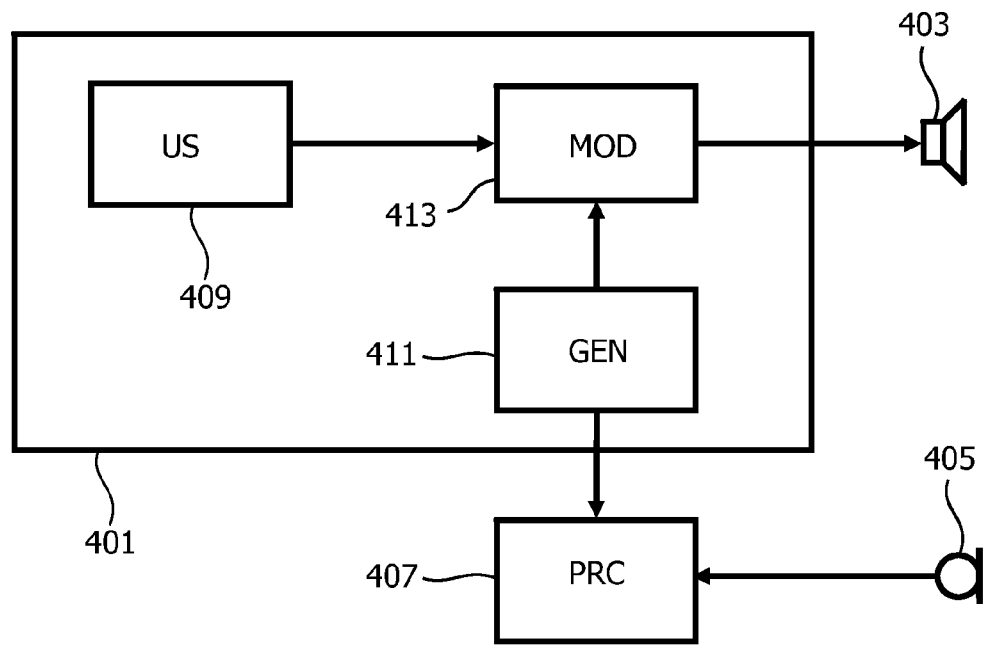
FIG. 4 illustrates an example of elements of an apparatus for determining a distance to an object in accordance with some embodiments of the invention.

FIG. 4 illustrates an example of the measuring system in more detail. The system comprises a test signal generator 401 which generates an ultrasonic test signal by modulating an audio band test signal on to an ultrasonic signal. The test signal generator 401 is coupled to a parametric loudspeaker 403 which radiates the modulated ultrasonic test signal.

A parametric loudspeaker is an audio device which uses the nonlinear properties of air to demodulate audio frequencies from a high intensity ultrasonic carrier signal. The ultrasonic carrier signal is typically an ultrasonic carrier wave with a very short wavelength. When an ultrasonic acoustic wave is projected from a transducer with a size much greater than the wavelength of the sound, a very narrow beam of ultrasound is produced. As the ultrasound propagates through the air an audio signal is demodulated from the ultrasonic carrier signal. In particular, any non-linearity in the audio path can act as a demodulator thereby recreating the original audio test signal that was used to modulate the ultrasound carrier signal. Such a non-linearity may occur automatically in the transmission path. In particular, the air as a transmission medium inherently exhibits a non-linear characteristic that results in the ultrasound becoming audible. Thus, in the example, the non linear properties of the air itself cause the audio demodulation from a high intensity ultrasound signal.

The demodulated audio signal also forms a highly directional beam as a consequence of the tight bundling of the primary ultrasound carrier wave. The high directionality of the sound source allows audible sound to be directed to very specific locations which is highly advantageous for the purpose of accurately estimating a distance. The parametric loudspeaker is furthermore both compact and has an inherently small spot size without the need of additional focusing.

Whilst a parametric loudspeaker can direct a sound beam towards any point of the room with a very high precision, once the beam strikes an object the audio frequency components are scattered throughout the room. If a microphone is placed coincidentally with the parametric transducer, it will detect the reflected audio signals. This system appears similar to a conventional ultrasonic range detection sonar system based upon an ultrasound transmitter and receiver. A key difference is that the ultrasound sonar system transmits and receives ultrasound, whereas the system of FIG. 4 transmits ultrasound and receives an audio range signal. Ultrasound is reflected from a wall in a highly specular manner. If the wall is perpendicular to the transmitter a strong signal will be reflected back towards the receiver. As the angle between the transmitter and the wall becomes increasingly parallel the signal is reflected away from the receiver. The signal to noise ratio is thus degraded, and there is also a potential risk that subsequent reflections of the ultrasound beam may result in a strong signal at the receiver, causing anomalous readings.

The new method transmits an ultrasound beam but receives an audio frequency signal. High frequency components tend to be scattered more specularly than low frequency components, indeed low frequency components are scattered in an almost omni-directional dispersion pattern. As much of the reflected audio signal is reflected approximately omni-directionally, sound is always reflected back towards the receiver regardless of the angle the transducer makes with the wall. The new method is therefore always able to accurately determine the nearest distance to the wall or reflecting object at a given beam angle.

In the system of FIG. 4, the output of the parametric loudspeaker 403 is an ultrasonic carrier wave modulated with the audio frequency test signal. During the transmission from the loudspeaker to the wall, the audio is demodulated from the ultrasonic carrier signal by a non-linear interaction to form the audible sound beam. Thus a highly directional and narrow sound signal is generated and radiated towards the walls.

At the first obstacle encountered by the sound beam, the audio band signal is scattered relatively evenly into the room and thus is also reflected back towards the parametric loudspeaker 403.

The system of FIG. 4 further comprises an audio band sensor 405 which generates an audio band captured signal. In the specific example, the audio band sensor 405 is a standard audio band microphone with a bandwidth from e.g. below 1 kHz to above e.g. 8 kHz. Thus, the microphone 405 captures (at least part of) the audio band and generates a corresponding electrical signal. The reflection/scattering of the object (wall) results in the demodulated audio test signal being reflected towards the microphone 405 and thus the captured audio band signal comprise the demodulated reflected audio band signal resulting from the in-air demodulation of the modulated ultrasonic test signal.

The microphone 405 is coupled to a distance circuit or processor 407 which receives the captured audio band signal. It is further coupled to the test signal generator 401 from which it receives a reflected audio signal estimate for the audio band test signal. Specifically, the reflected audio signal estimate may be determined to correspond to the audio signal that results from the non-linear demodulation of the audio band test signal in the air. Thus, the difference between the reflected audio signal estimate and the audio band test signal may reflect the non-linearities of the audio path (and specifically the demodulation).

The distance circuit 407 then proceeds to generate a distance estimate for the distance from the parametric loudspeaker 403 to the object in response to a comparison of the audio band captured signal and the reflected audio signal estimate, and specifically by comparing the relative timing of these.

The following approach will for brevity and clarity initially be described for a scenario where these non-linear effects are not significant, i.e. where the reflected audio signal estimate is the same as the audio band test signal. Thus, in such an embodiment, the distance circuit or processor 407 is directly fed the audio test band.

The system may determine the distance based on a measured delay time corresponding to the path length from the parametric loudspeaker 403 to the microphone 405. Specifically, by measuring the time difference between the transmitted signal and the reflected signal the speed of sound can be used to calculate the distance between the system and the reflecting object/wall in that direction.

Figure 5:
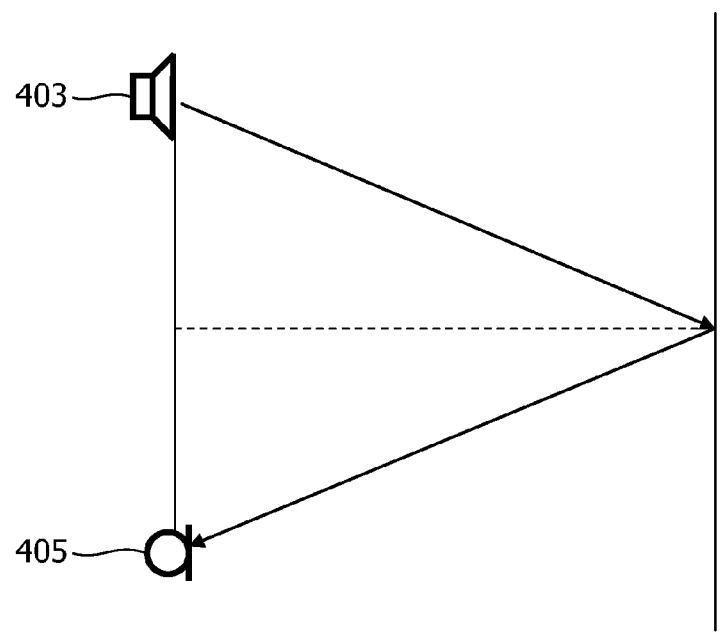
FIG. 5 illustrates an example of a measurement scenario for an apparatus for determining a distance to an object in accordance with some embodiments of the invention.

The parametric loudspeaker 403 and the microphone 405 may specifically be co-located in which case the measured path length will correspond to twice the distance. It will be appreciated that as the distance increases between the parametric loudspeaker 403 and the microphone 405, this distance and the path between the parametric loudspeaker 403 and the microphone 405 will form a triangle allowing the distance to be calculated using simple geometric relations (ref. e.g. FIG. 5). In many embodiments, the distance between the parametric loudspeaker 403 and the microphone 405 is so small that the impact on the estimated distance can be ignored and the distance is simply calculated as the path length divided by two. This may typically be achieved if the distance between the parametric loudspeaker 403 and the microphone 405 is less than 5-10% of a minimum distance that is to be measured.

The following description will for brevity and clarity assume that the parametric loudspeaker 403 and the microphone 405 are completely co-located.

In order to determine the distance, the distance processor 407 may specifically use a correlation based technique as such techniques tend to be particularly robust for extracting distance information from noisy measured data.

Specifically, cross-correlating the generated audio test signal with the captured audio test signal from the microphone 405 will result in a peak in the cross-correlation corresponding to the time sample $T_r$ at which each echo is received back at the microphone 405, i.e. a path comprising one or more reflections will result in the audio test signal reaching the microphone with a corresponding delay. Thus, the peaks may be detected and used to determine path length estimates. There will typically be several peaks in the impulse response indicating multiple reflections as e.g. indicated in the example of FIG. 6. The first peak, $T_1$, corresponds to the first reflection. This can be used to provide information about the distance to the walls. The further peaks may correspond to multiple reflections and can be used to determine such multiple reflection paths. This may e.g. be used for higher order modelling of the room.

By converting the sample number of the first peak, $T_1$, into a time index (by dividing by the sampling frequency, fs) and then multiplying by the speed of sound (approx 340 ms$^{-1}$) and estimate of the total path length can be derived:

$$2D_\alpha = \frac{T_1}{fs} \times 340.$$

Figure 6:
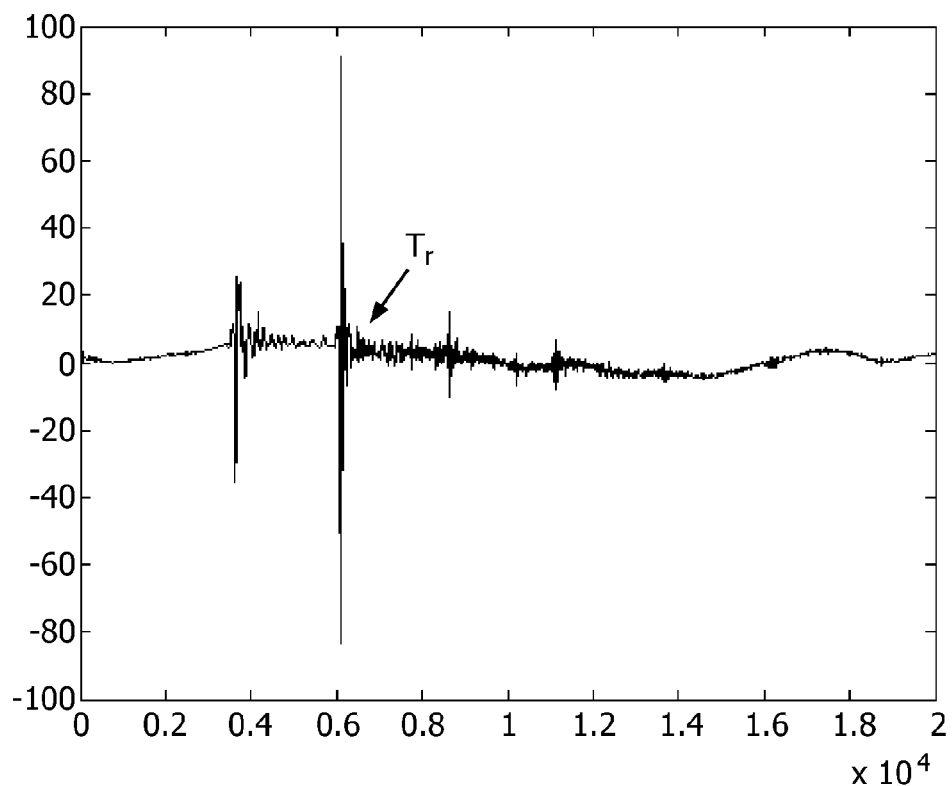
FIG. 6 illustrates an example of a correlation response for a measurement scenario for an apparatus for determining a distance to an object in accordance with some embodiments of the invention.

FIG. 6 illustrates a measured impulse response obtained in a typical room using a logarithmic sweep test signal and a parametric speaker. The first 4000 samples show a 'false impulse' due to the coupling between the parametric speaker 403 and the microphone 403. This is delayed by approximately 2600 samples due to the pre-processing included in the parametric array driving electronics. Subtracting the index of the first 'false peak' from the subsequent peaks gives the actual travel time/path delay for the audio path. The first large peak at approximately 6000 samples is due to the first reflection. Higher order reflections give rise to the following smaller peaks.

In the example the distance processor 407 determines the distance estimate in response to a timing of a correlation peak. The correlation peak may e.g. be selected at as the N$^{th}$ correlation peak in the measured correlation response where N may be 1, 2, . . . . In many embodiments, the first correlation peak corresponds to a direct coupling and the distance estimate may be determined in response to the timing of the second correlation peak. Thus the distance estimate may be determined in response to the timing of the first peak that occurs after a given time threshold/delay. This delay may be determined based on the correlation response itself, e.g. it may be set to correspond to the time of the first (direct coupled) correlation peak or may be set to a predetermined time delay e.g. corresponding to a delay higher than the maximum expected distance between the parametric loudspeaker 403 and the microphone 405 yet smaller than the delay corresponding to twice the minimum distance to be measured.

Similarly, the path length for multiple reflections may be determined from the timing of correlation peaks corresponding to values of N=3, 4, 5 . . . (or 2 if the direct coupling is sufficiently attenuated) or reflections after a given delay.

The approach may provide improved distance estimation in many scenarios. In particular, the approach may overcome or mitigate the issues of lobbing, spot size, bandwidth limitations and speaker (array) size associated with using a conventional loudspeaker array. Indeed, the approach may allow a low complexity approach that can provide a very directional sound radiation to be used for distance determination while maintaining reduced sizes and low cost/complexity.

Figure 7:
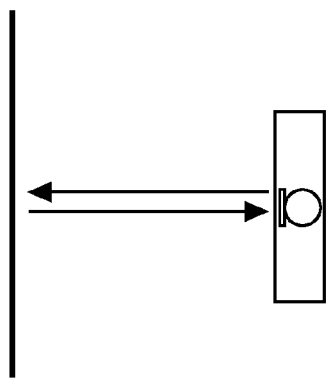
FIGS. 7 and 8 illustrates an example of an ultrasonic distance measurement scenario for an ultrasonic ranging system in accordance with prior art.
Figure 8:
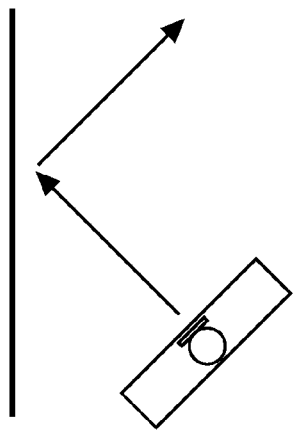

Furthermore, the approach is not prone to suffer from the problems typically associated with ultrasound ranging systems. Such ultrasound ranging systems may perform well in situations when the ultrasound ranging device is perpendicular to the reflecting wall such as illustrated in FIG. 7. However, when the reflecting surface is at an angle to the ranging device, the ultrasonic test signal is not reflected back to the ranging device as illustrated in FIG. 8. At best this results in reduced signal to noise ratio and there is also a potential risk that subsequent reflections of the ultrasound beam may result in a strong signal at the receiver. Thus, there is a high probability that this results in an inaccurate or erroneous distance measurement which may instead correspond to a plurality of reflections. Accordingly, ultrasonic ranging is not suitable for flexible systems and is often not useful for e.g. automatic room calibration systems but require manual intervention and operation.

Figure 9:
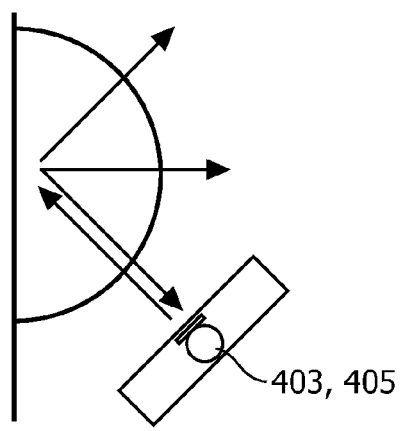
FIG. 9 illustrates an example of a measurement scenario for an apparatus for determining a distance to an object in accordance with some embodiments of the invention.

In contrast, the described approach transmits an ultrasound beam but receives an audio frequency signal. High frequency components tend to be scattered more specularly than low frequency components, and indeed low frequency components are scattered in an almost omni-directional dispersion pattern. This is exploited in the system of FIG. 4 where much of the reflected audio signal is reflected approximately omni-directionally as illustrated in FIG. 9. Accordingly, sound is always reflected back towards the microphone 405 regardless of the angle the parametric speaker 403 forms with the wall. The approach is therefore much more robust to variations in the angle and will typically always be able to accurately determine the nearest distance to a reflecting object at a given beam angle. Thus, the system is particularly suitable for automatic distance measurements such as e.g. used when determining an audio environment or room geometry.

In more detail, the signal generator 401 comprises an ultrasound generator 409 which generates an ultrasound signal that in the specific case is a single ultrasound carrier. The ultrasound signal has a frequency bandwidth that includes sounds in the ultrasonic range and specifically which are higher than 20 kHz. In the specific example, the ultrasonic generator 409 thus generates an ultrasound signal which is a single tone with a frequency above 20 kHz.

The signal generator 401 further comprises an audio generator 411 which generates the audio band test signal. The audio band test signal comprises frequency components that are below 15 kHz and typically frequency components below 10 kHz. In many embodiments, the audio band test signal comprises frequency components below 5 kHz or 2 kHz. In many embodiments, the lower frequencies may be advantageous as the reflection is increasingly non-directional for lower frequencies. However, higher frequencies may provide advantageous directionality of the incident sound beam on the reflecting surface. Accordingly, the exact frequency composition of the audio band test signal may depend on the requirements and preferences of the individual embodiment.

The audio band test signal may in some embodiments be a single tone signal. In other embodiments, the audio band test signal may have an increased frequency bandwidth and may e.g. be a white or pink noise signal and may e.g. be generated as a maximum length sequence. As another example, the audio band test signal may be a (logarithmic) sweep of a single tone. The specific signal used in the individual embodiment may be selected to suit the specific preferences and requirements.

The audio generator 411 is further coupled to the distance processor 407 which receives a copy of the audio band test signal for use in the determination of the distance and specifically for use in the correlation. In many embodiments, the audio band test signal that is transmitted may not be identical to the one that is used for the correlation. For example, in many embodiments a reflected audio signal estimate may be used instead of the audio band test signal that is modulated on the ultrasonic signal.

Specifically, the audio generator may generate the audio band test signal and then proceed to apply the expected non-linearities to the signal to generate a reflected audio signal estimate which is then fed to the distance processor 407 and used for the distance estimation and specifically the correlation.

Equivalently, the audio generator 411 may first generate an initial audio signal that is suitable for the correlation performed by the distance processor 407. It may then proceed to generate the audio band test signal by performing a pre-compensation of the initial audio signal prior to modulation of the ultrasonic signal where the pre-compensation seeks to compensate for the non-linear effects of the audio path. Thus, in such an example, the initially generated audio signal is used as the reflected audio signal estimate and the pre-compensated version of the correlation audio signal is used as the audio band test signal.

Different approaches may be used for such a pre-compensation depending on the specific embodiment. Essentially the non-linear demodulation results in a distorted version of the input audio signal and in order to achieve a clean audio signal corresponding to the desired audio signal used in the decorrelation, an inverse nonlinear filter may be applied to the correlation audio test. During the demodulation in the air, the nonlinear distortion created by the pre-compensation will at least partly be cancelled out.

Various specific approaches for inverse nonlinear filtering operations to remove nonlinear distortion components from the audio output of a parametric loudspeaker will be known to the person skilled in the art and will for brevity not be described further herein. Examples of suitable approaches may for example be found in Lee, K. and Gen, W. "Bandwidth-Efficient Recursive Pth-Order Equalisation for correcting Baseband Distortion in Parametric Loudspeakers" IEEE Trans. on Audio Speech and Language Proc. Vol 4, No 2. March 2006 and Kite, T. D., Post J. T. and Hamilton M. F. "Parametric Array in Air: Distortion Reduction by Preprocessing" Proc 16th Int. Cong. Acoust., Vol. 2. June 1998.

In some embodiments the audio test signal may advantageously have a bandwidth of no less than 500 Hz, 1 kHz, 2 kHz, 5 kHz or 8 kHz.

Using such a wideband signal may for example be used to derive additional information about the reflecting object.

For example, the inventors have realised that the spectral signal received at the microphone 405 will be dependent on the angle between the reflecting surface and the sound beam. Particularly, when the object surface is perpendicular, the high frequency components will be reflected strongly towards the microphone. However, as the beam angle with respect to the object surface becomes increasingly parallel, the high frequency content of the reflected beam arriving at the microphone 405 will decrease.

In the system of FIG. 4 the distance processor 407 is arranged to further generate an angle estimate between the direction of the ultrasound beam and the reflecting surface of the object in response to a frequency distribution characteristic of the audio band captured signal from the microphone 405. The microphone signal may in some embodiments be used directly (e.g. if the room is otherwise sufficiently silent) or may possibly be processed first (e.g. may be filtered).

In the specific example, the distance processor 407 is arranged to generate the angle estimate such that a higher relative high frequency energy concentration is indicative of a more perpendicular angle. The distance processor 407 biases the angle estimate towards a 90° angle for increasing energy concentration towards higher frequencies.

As a specific example the distance processor 407 may measure the energy in a high frequency interval and a low frequency interval for both the audio band test signal and for the captured microphone signal. The ratio of the relative attenuation in each frequency band may then be generated. The angle may then be determined as a function of this ratio. For example, the ratio may be used to perform a look up in a table of predetermined values relating the ratio to angles. The predetermined values may be generated by a dedicated measurement process e.g. as part of the manufacturing or design phase.

The inventors have further realised that the spectral signal received at the microphone 405 will be dependent on the size of the reflecting surface. Indeed, it has been found that the frequency response of the reflection towards the microphone will be dependent on the size and shape of the object from which the beam is scattered. If the object is large compared to the audio wavelength of the modulated signal, then a high proportion of the signal will be reflected back to the microphone 405 (at that audio frequency). If the object is small compared to the wavelength, less signal will be reflected back to the microphone 405. Based on the frequency characteristic of the signal captured at the microphone, the distance processor 407 can generate a size estimate for the object.

In the system of FIG. 4 the distance processor 407 is thus arranged to further generate a size estimate for the object in response to a frequency distribution characteristic of the audio band captured signal. The microphone signal may in some embodiments be used directly (e.g. if the room is otherwise sufficiently silent) or may possibly be processed first (e.g. may be filtered).

In the specific example, the distance processor 407 is arranged to generate the size estimate such that a higher relative low frequency energy concentration is indicative of a larger size. The distance processor 407 biases the angle estimate towards a larger size estimate for an increasing energy concentration towards lower frequencies.

As a specific example the distance processor 407 may measure the energy in a high frequency interval and a low frequency interval for both the audio band test signal and for the captured microphone signal. The ratio of the relative attenuation in each frequency band may then be generated. The size estimate may then be determined as a function of this ratio. For example, the ratio may be used to perform a look up in a table of predetermined values relating the ratio to sizes. The predetermined values may be generated by a dedicated measurement process e.g. as part of the manufacturing or design phase.

Figure 10:
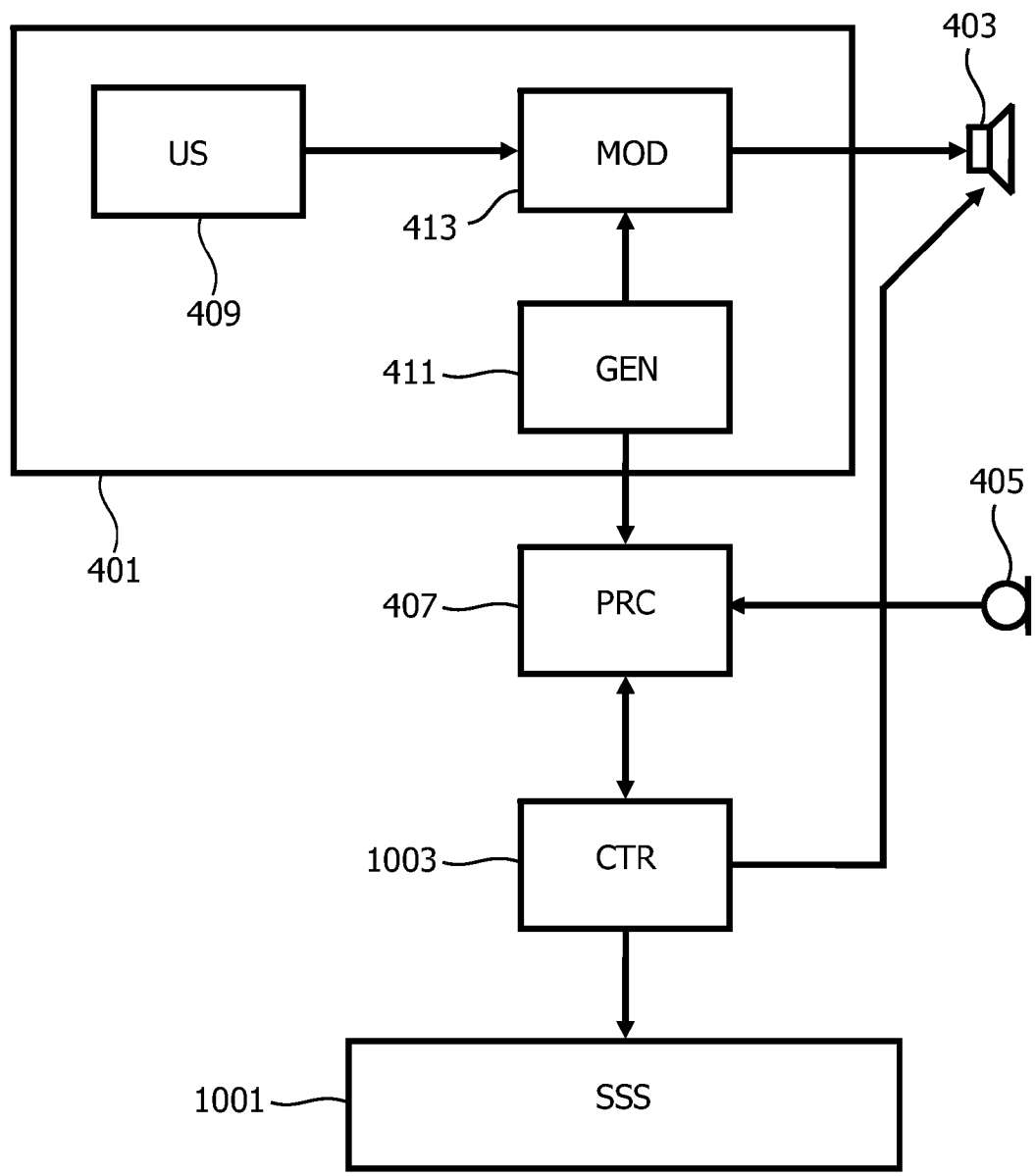
FIG. 10 illustrates an example of elements of a spatial sound reproduction system in accordance with some embodiments of the invention.

The system of FIG. 4 may specifically be used to control and automatically adapt a spatial sound reproduction. FIG. 10 illustrates an example of spatial sound reproduction system which includes the system of FIG. 4.

In addition to the system of FIG. 4, the spatial sound reproduction system comprises a spatial sound system 1001 which specifically may be a five channel surround system such as e.g. one using a loudspeaker setup such as illustrated in FIGS. 1-3.

The system further comprises an audio environment circuit 1003 which is arranged to control the distance estimation system of FIG. 4 and to adapt the spatial sound system 1001 in response to the distance estimates received from this system.

Specifically, the audio environment circuit 1003 comprises functionality for iteratively varying the direction in which the ultrasonic signal is radiated such that the distance to walls and other objects in a number of different directions can be determined.

For example, a measurement and calibration process may begin by the audio environment circuit 1003 directing the ultrasonic beam at an arbitrary angle, say −90 degrees, where 0 degrees is perpendicular to the sound rendering system. A distance evaluation is then performed in this direction and the resulting distance estimate is fed to the audio environment circuit 1003. The beam angle is then updated incrementally and the measuring process repeated until sufficient data has been collected.

Typically sound reproduction hardware is placed in the corner of a room or flush to a wall, and the user will occupy the region in front of the system. For this reason a suitable angular measurement might be −90 degrees to +90 degrees in increments of 5 or 10 degrees. The finer the angular resolution, the more data will be available for determining the audio environment geometry.

The angular direction into which the beam is directed can e.g. be controlled by physically rotating the transducer, or through electronic steering using beam forming techniques and a segmented transducer array.

For example, the variation of measurement direction can be achieved by mounting the parametric loudspeaker 403 on a motorised hinged mechanism or bearing. Using a feedback control system the absolute angular direction of the beam relative to the sound reproduction system can be accurately controlled. The motorised mechanism can allow the parametric loudspeaker 403 to be physically rotated to allow a full raster scanning of the MOM.

In some embodiments, the parametric loudspeaker may comprise an array of ultrasonic transducers and the audio environment circuit 1003 may be arranged to control a value of the first direction by controlling at least one of a relative delay, phase and gain for the ultrasonic transducers. Thus, the audio environment circuit 1003 may control and activate beamforming of the radiated ultrasonic signal.

E.g., it is possible to control the directivity of an array of transducers by altering the phase at which the transducers reproduce an acoustic signal. Making use of an array of ultrasonic transducers, a parametric loudspeaker can thus be constructed which allows the main ultrasonic carrier signal to be steered into a wide range of angles electronically, without physically altering the orientation of the transducer array. Such an embodiment may be used for raster scanning of the room.

Based on the distance measurements for the different directions, the audio environment circuit 1003 may proceed to estimate an audio environment geometry for the spatial sound system 1001. In the example, the audio environment circuit 1003 thus proceeds to estimate the room geometry.

For example, the audio environment circuit 1003 may build a numerical model of the room by using an optimization algorithm to fit modelled walls to the data. In some cases regular polygons can be fitted to the measurement data, such as a rectangle. This is not always the case as some rooms have irregular shapes, and curved walls. Under such circumstances each wall can be fitted to the data separately with heuristic algorithms.

Figure 11:
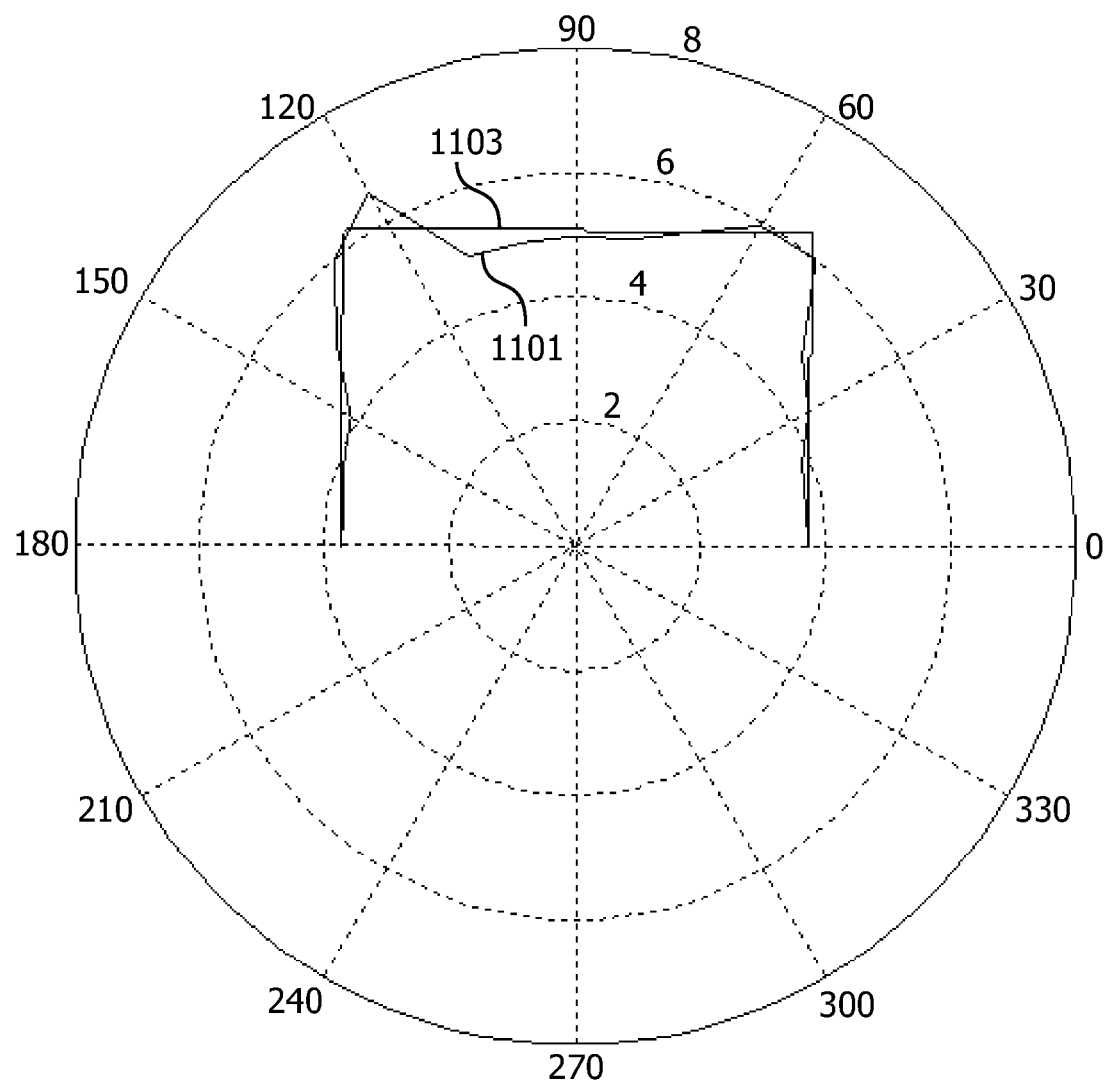
FIG. 11 illustrates an example of a room geometry determination by a spatial sound reproduction system in accordance with some embodiments of the invention.

FIG. 11 shows the results of an actual room measurement using a logarithmic sweep method and peak extraction to identify the distance between the parametric loudspeaker and walls. The best fit rectangle 1101 representing the room is illustrated together with the measured data 1103. At total of 19 measurements were made from −90 to 90 degrees in increments of 10 degrees. Only the first order reflections were considered and all further peaks in the correlation impulse response were disregarded. The model predicted the wall locations relative to the parametric loudspeaker to within 0.1 m. In this case the wall behind the parametric loudspeaker was not measured. As the listener will be in front of the loudspeaker system, the influence of the rear wall will typically have little effect on the spatial image perceived by the listener.

Once the geometry of the audio environment (and specifically the room) has been determined, the audio environment circuit 1003 may proceed to automatically adapt the spatial sound system 1001 to this environment.

For example, for spatial sound reproduction systems that use reflected audio to provide a spatial experience such as exemplified in FIGS. 2 and 3, the reflected sound from the last reflection point before the sound beam reaches the user is perceived by a listener to be the origin of the sound source. To optimize the spatial experience (e.g. the home cinema experience), the reflection points need to be chosen carefully and thus the radiated sound beams should be accurately controlled to match the specific audio environment. This can only be done once the relative locations of the walls are known with respect to the loudspeakers of the spatial sound system and the (possibly assumed) listening position. This can be performed based on the estimated room geometry and the system of FIG. 10 may thus implement an automatic or semi automatic setup of the spatial sound system 1001.

The described system may be particularly beneficial for compact sound systems that seek to emulate discrete multi-channel loudspeaker systems, such as home cinema soundbar systems. The geometric room model allows the speaker system to adjust the parameters of the loudspeaker system to best suit the room geometry and provide the best subjective spatial effects, for example by adjusting the angular direction of the ultrasound beams to provide a very wide listening experience.

In some embodiments, the estimation of the audio environment may be based on more complex algorithms and consider more specific information. For example, the estimates of the angle between the radiated sound beam and the reflecting surfaces may be used to model the room such that the walls are at angles corresponding to the measurements. This information may dramatically increase the accuracy and speed of an algorithm designed to identify the room geometry.

Furthermore, as described previously the further correlation peaks may be used to generate multiple reflection distance estimates for audio paths that include more than one reflection between the parametric speaker and the audio band sensor. These multiple reflection path distances may then additionally be used to fit the model to the available measurement data.

For example, if the measured data is particularly noisy or too few angular measurements were made, increasing the accuracy of the reconstruction may necessitate using higher order reflection data. This may e.g. be done by first considering the single reflection distance estimates to determine a first order room model. The multiple reflections may then be fitted to the first order room model using ray tracing and the model may be modified to improve the matching to the measured multiple reflection distances.

As another example, if an accurate model of the room size was required, e.g. for prediction and equalisation of low frequency room modes, it is possible to estimate the location of the back wall. This may be achieved by examining a higher order reflection model considering the estimated multiple reflection path distances.

In some embodiments the audio environment circuit 1003 may also determine a reverberation time for the audio environment and use this to determine the audio environment geometry. The reverberation time represents the length of time it takes for a sound to decay to an intensity of e.g. −60 dB below its starting value and is strongly coupled to the room volume. The reverberation time can be freely calculated from the measured impulse responses. Examples of approaches for measuring reverberation time may e.g. be found in the document Schroeder M. R., "New Method of Measuring Reverberation Time", J. Acoust. Soc. Am. 1965, and Schroeder M. R., "Integrated-Impulse method measuring sound decay without using impulses", J. Acoust. Soc. Am. Vol. 66(2) 1979. The measured reverberation time can specifically be used to set a boundary for the possible volume of the room and the model can be fitted under this constraint.

In many embodiments, the parametric loudspeaker 403 and the microphone 405 may be independent of the spatial sound system 1001. However, in some embodiments, the same functionality may be used for both the distance measurements and for the normal operation of the spatial sound system 1001.

Specifically, in some embodiments, the parametric speaker 403 may also be used to reproduce sound for at least one spatial channel. In particular, the parametric speaker 403 may be used to reproduce the sound for a surround channel of the spatial sound system 1001 by reflections of walls. As the parametric loudspeaker 403 in such a case may already be part of the spatial sound system, the only addition required to perform the described automatic calibration and adaptation of the spatial sound system 1001 would be a microphone 403 and associated electronics and a software package.

An example of a spatial sound system 1001 using parametric speakers for generating surround channels may be described with reference to FIG. 2.

In the system of FIG. 2, the surround sound signals 205, 207 may specifically not be conventional audio sound signals but may rather be radiated as ultrasound signals. Thus, the system employs parametric loudspeakers that radiate ultrasonic surround sound signals 205, 207.

Such a highly directional beam can be controlled much better and in the system of FIG. 2 it can be directed to the listening position 111 via well defined reflections of the walls 209-213 of the room and can be controlled based on the generated room geometry model. The reflected sound will reach the ears giving the listener the perception of having sound sources located at the back of the room.

Thus, the system of FIG. 2 uses an ultrasound transducer/parametric loudspeaker that has a very directive sound beam as, or as part of, surround speakers 201, 203 that are located to the front of the listening position 111. This ultrasound beam can easily be directed to the side or back wall 209-213 of the room such that the reflected sound will reach the listener's ears to provide the perception of having sound sources placed at the back of the room. The same ultrasound transducers/parametric loudspeakers can be used to perform the distance measurements.

The ultrasonic signals 205, 207 are generated by amplitude modulating the ultrasound carrier signal by the audio signal of the surround channel. This modulated signal is then radiated from the surround speakers 201, 203. The ultrasound signal is not directly perceivable by a human listener but the modulating audio signal can be demodulated by non-linearities to recreate the original audio signal that was used to modulate the ultrasound carrier signal. Thus, the ultrasonic signal may automatically be demodulated to provide the audio sound to the listener.

Examples and further description of the use of ultrasound transducers for audio radiation may for example be found in the PhD thesis "Sound from Ultrasound: The Parametric Array as an Audible Sound Source" by F. Joseph Pompei, 2002, Massachusetts Institute of Technology.

The use of an ultrasound radiation of the surround channels provides a very narrow beam. This allows for the reflections to be better defined and controlled and can in particular provide a more accurate control of the angle of arrival at the listening position. Thus, the approach may allow the virtual perceived position of the surround sound sources to be much better defined and controlled. Furthermore, the use of an ultrasound signal may allow such a position to be perceived to be closer to a point source, i.e. to be less smeared. Also, the narrow beam of an ultrasound transducer reduces the radiation of sound along other paths and specifically reduces the sound level of any sound reaching the listening position through a direct path. Furthermore, in combination with the described accurate room modelling this can be adapted to closely follow the specific room geometry.

In the specific example, surround loudspeakers 201, 203 do not merely contain an ultrasound transducer or radiate only ultrasound signals. Rather, each of the surround loudspeakers 201, 203 comprise a speaker arrangement which includes both a directional ultrasound transducer for emitting ultrasound towards the walls 205, 207 as well as an audio range loudspeaker which radiates sound in the audio frequency range (say below 5-10 kHz).

In particular, the audio sound quality resulting from the use of such ultrasonic approaches is in some embodiments and scenarios not optimum as the process through which the ultrasonic carrier is demodulated to render the modulating audio signal audible tends to be inefficient and is inherently non linear. Ultrasonic loudspeakers therefore tend to produce a typically suboptimal sound quality and also tend to have low power handling capacity thereby making it difficult to produce high sound levels.

In the system of FIG. 2, this effect is mitigated by the ultrasound transducer being supplemented by an electro dynamical front-firing loudspeaker that further radiates some of the sound from the surround channel. This audio band signal radiation may reach the listening position 111 via a direct path. Thus, in addition to the reflected ultrasound signals 205, 207, the surround loudspeakers 201, 203 may also generate audio band signals 215, 217 which specifically may reach the listener by a direct path.

The use of the audio range loudspeaker to supplement the directional ultrasound transducer provides an improved sound quality in many embodiments. In particular, it may provide an improved sound quality at lower frequencies. Such lower frequencies may typically not provide as many spatial cues as higher frequencies and therefore the listener may still perceive the surround sound to arrive from the rear, i.e. may still perceive that there are virtual sound sources to the rear. Furthermore, the audio band signals may be delayed relative to the reflected paths such that the main spatial cues are provided by the reflected signals Further details of such an approach may be found in European Patent application EP09162007.0.

In some embodiments, the audio environment circuit 1003 is also operable to estimate a listening position. Specifically, it may be arranged to receive a captured signal from the microphone 407 which comprises a user originated sound, and it may then determine the listening position in response to this and the audio environment geometry (specifically the room model).

E.g., it is possible to determine the user location using the newly identified room model by prompting the user to make an impulsive sound such as a hand clap. The impulsive nature of the hand clap will give rise to a signal at the microphone 403 made up of a train of sharp peaks of decreasing amplitude. The first peak is due to the direct sound from the listener to the microphone, and the following peaks resulting from subsequent reflections by the room boundaries. Because the impulse train is determined by the wall positions relative to the user and the microphone 405, each listening position gives rise to a unique signal. Using an optimization routine the user location can be inferred from the numerical model of the room, and the unique pulse train signal.

Alternatively the orientation of the sound system with respect to the room geometry can be used to infer the most likely listening area. E.g. for home cinema applications, the listener will often be seated directly in front of the television. Assuming the sound reproduction system is aligned with the television, a listening zone can be inferred without dedicated measurements.

In some embodiments, the audio environment circuit 1003 may further be arranged to take into account dynamic variations in distance estimates for corresponding directions. For example, the dynamic variations in the distance estimate for substantially identical (or differing by less than a threshold) may be determined and taken into account. For example, the distance estimates in a given direction may be repeated a number of times with a certain time interval. Some of these measurements may result in shorter distances than others and this may be due to an object passing between the device and the corresponding wall. Accordingly, the audio environment circuit 1003 may take this into account when determining the room geometry.

As an example, the system may repeat the measuring process a number of times. For example, the sweep (e.g. from −90° to +90° may be repeated a number of times (or continuously)). In this case the fixed objects, such as walls, will provide a fixed background while users or other moving objects will generate a dynamic signal that varies for the different scans. This dynamic variation may then be used when determining the room geometry, e.g. by ignoring measurements that show too much dynamic variation. Thus, the audio environment circuit 1003 may be arranged to estimate the audio environment geometry in response to dynamic variations in the distance estimates.

In some embodiments, the audio environment circuit 1003 may alternatively or additionally use the dynamic variations to determine a listening position. Thus, the audio environment circuit 1003 may be arranged to estimate a listening position in response to dynamic variations in the distance estimates.

E.g. as users will tend to be present for a relatively short proportion of the time but to be static for some time when using the spatial sound system 1001. The audio environment circuit 1003 may search for directions for which the distance measurements show dynamic variations that have appropriate temporal variations. For example, a direction which provides a distance estimate of, say, 5 meters for 80-90% of the time and, say, 3 meters for most of the remaining time may be considered to be likely to correspond to a listening position. It will be appreciated that in practice much more complex criteria can be applied. In addition, the size estimate may be used to estimate whether it is likely that the detected object has a size corresponding to a human.

The listening position can therefore be identified by performing multiple raster scans of the room and extracting the dynamic signals. The dynamic data can then be used to extrapolate the most likely listening position.

In the above description, the speed of sound was used to estimate the distance. In many embodiments, a predetermined speed of sound may be used. However, in some embodiments, the apparatus may be arranged to estimate the speed of sound based on a measurement and to determine the distance in response to the estimate.

Indeed, in applications such as e.g. a home cinema setup, the accuracy that can be achieved with a simple nominal value for the speed of sound (e.g. 340 ms$^{-1}$) is likely to be sufficient. However, in a more general distance measurement, it may be desirable to have more accurate distance estimates and therefore it may be useful to measure the ambient speed of sound, which depends on the temperature, altitude and humidity of the air. Thus, the apparatus may comprise functionality for measuring the relevant parameters to provide a more accurate estimate of the ambient speed of sound in a particular audio environment. For example a thermometer could be used to measure the temperature and adjust the speed estimate based on well known formula/relationships. Estimates can be further improved if the humidity and ambient pressure are measured.

Another method of measuring the ambient speed of sound involves measurements of the time taken for the sound to travel a fixed distance. For example, if the layout of the system may be known and thus the relative distance between microphones and loudspeakers may be known. Using this information it is possible to determine the speed of sound from the standard distance time relations and the measured time of flight.

In applications where two ultrasound loudspeakers are used for the rear channels, multiple measurements may e.g. be made using both loudspeakers over a certain area of flat wall/reflection surface. If sufficient data is collected, a set of interdependent measurements of time at different angles can be obtained. Inputting this data, along with the known layout of the active components, into a mathematical model allows a relation to be developed which can only be satisfied by one value for the speed of sound. This speed may then subsequently be used for the distance determination.

In some embodiments, the apparatus may further comprise means for capturing a detected ultrasonic signal comprising the ultrasonic signal radiated from the parametric loudspeaker 403. In such embodiments, the distance measurement may further be in response to this detected ultrasonic signal. Alternatively or additionally, the angle estimate between the first direction and a reflecting surface of the object may be determined in response to the detected ultrasonic signal.

Thus, the apparatus may be arranged to measure the reflected ultrasonic signal thereby providing a second measurement that can be used for the distance measurement. This may provide particularly advantageous performance for scenarios where the reflecting surface may be close to being perpendicular to the beam direction.

Indeed, for angles close to 90° a high proportion of the ultrasound is reflected thereby allowing an accurate distance determination based on ultrasound. However, at angles deviating significantly from 90°, the audio band detection is likely to provide the best distance measurements due to the low ultrasound reflection. In some embodiments, the apparatus may determine a distance estimate based on the audio signal and another distance estimate based on the ultrasonic signal. The final distance estimate may then be determined as a weighted combination of the two estimates, e.g. with the weight being dependent on a signal level (e.g. power, energy or amplitude) of the ultrasonic signal.

The additional measurement may also be used to estimate the angle of the reflecting surface. For example, a high concentration of ultrasound would indicate that the surface is perpendicular whereas lower signal levels are likely to indicate the angle deviating from perpendicular.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for determining a distance to an object, said apparatus comprising:
    a test signal generator for generating an ultrasonic test signal by modulating an audio band test signal on an ultrasonic signal;
    a parametric loudspeaker for radiating the ultrasonic test signal in a first direction;
    an audio band sensor for generating an audio band captured signal based on a demodulated reflected audio band signal resulting from the ultrasonic test signal, which is reflected by said object; and
    a distance circuit for generating a distance estimate for a distance from the parametric loudspeaker to the object in response to the audio band captured signal and an reflected audio signal estimate for the audio band test signal.

2. The apparatus of claim 1 wherein the distance circuit is arranged to generate an angle estimate between the first direction and a reflecting surface of the object in response to a frequency distribution characteristic of the audio band captured signal.

3. The apparatus of claim 1 wherein the distance circuit is arranged to generate a size estimate for the object in response to a frequency distribution characteristic of the audio band captured signal.

4. The apparatus of claim 1 wherein the distance circuit is arranged to determine an earliest correlation peak between the audio band captured signal and the reflected audio signal estimate after a time threshold and to generate a multiple reflection distance estimate in response to a timing of a subsequent correlation peak between the audio band captured signal and the reflected audio signal estimate.

5. The apparatus of claim 1 further comprising an audio environment circuit arranged to:
    vary the first direction;
    receive distance estimates for different values of the first direction; and
    determine an audio environment geometry in response to the distance estimates.

6. The apparatus of claim 5 wherein the parametric loudspeaker comprises an array of ultrasonic transducers and the audio environment circuit is arranged to control a value of the first direction by controlling at least one of a relative delay, phase and gain for the ultrasonic transducers.

7. The apparatus of claim 5 wherein the distance circuit is arranged to generate a multiple reflection distance estimate in response to a comparison of the audio band captured signal and the reflected audio signal estimate, the multiple reflection distance estimate being indicative of a distance of a path from the parametric speaker to the audio band sensor comprising a plurality of reflections; and wherein the audio environment circuit is further arranged to determine the audio environment geometry in response to the multiple reflection distance estimate.

8. The apparatus of claim 5 wherein the audio environment circuit is arranged to determine a reverberation time for the audio environment and to determine the audio environment geometry in response to the reverberation time.

9. The apparatus of claim 5 wherein the audio environment circuit is arranged to receive a further audio band captured signal comprising a user originated sound and to determine a listening position in response to the further audio band captured signal and the audio environment geometry.

10. The apparatus of claim 5, wherein the distance circuit is arranged to iteratively determine distance estimates for corresponding values of the first direction, and the audio environment circuit is arranged to estimate the audio environment geometry in response to dynamic variations in the distance estimates for the corresponding values of the first direction.

11. The apparatus of claim 5, wherein the distance circuit is arranged to iteratively determine distance estimates for corresponding values of the first direction and the audio environment circuit is arranged to estimate a listening position in the audio environment in response to dynamic variations in the distance estimates for the corresponding values of the first direction.

12. A spatial sound reproduction system comprising an apparatus of claim 5 and wherein the audio environment circuit is arranged to adapt a characteristic of a spatial sound reproduction in response to the audio environment geometry.

13. The spatial sound reproduction system of claim 12 wherein the audio environment circuit is arranged to control a direction of directional sound for at least one spatial channel in response to the audio environment geometry.

14. The spatial sound reproduction system of claim 12 wherein the parametric speaker is arranged to reproduce sound for at least one spatial channel.

15. A method of determining a distance to an object, the method comprising:
generating an ultrasonic test signal by modulating an audio band test signal on an ultrasonic signal;
radiating the ultrasonic test signal in a first direction from a parametric loudspeaker;
capturing an audio band captured signal by an audio band sensor, the audio band captured signal being based on a demodulated reflected audio band signal resulting from the ultrasonic test signal, which is reflected by said object; and
generating a distance estimate for a distance from the parametric loudspeaker to the object in response to the audio band captured signal and a reflected audio signal estimate the audio band test signal.

* * * * *